United States Patent [19]
Erickson

[11] 3,711,791
[45] Jan. 16, 1973

[54] FRUSTRATED TOTAL INTERNAL REFLECTION LASER Q-SWITCH

[76] Inventor: Allen M. Erickson, 12409 Eastbourne Drive, Silver Spring, Md. 22310

[22] Filed: May 3, 1971

[21] Appl. No.: 139,764

[52] U.S. Cl.........331/94.5 Q, 331/94.5 C, 350/285, 307/88.3
[51] Int. Cl..............................................H01s 3/00
[58] Field of Search......331/94.5; 350/285; 307/88.3

[56] References Cited

UNITED STATES PATENTS

| | | | |
|---|---|---|---|
| 2,997,922 | 8/1961 | Kaprelian | 350/285 |
| 3,389,348 | 6/1968 | De Maria | 331/94.5 |
| 2,565,514 | 8/1951 | Pajes | 350/28.5 |
| 3,299,368 | 1/1967 | Klebba | 331/94.5 |
| 3,444,478 | 5/1969 | Gudmundsen et al. | 331/94.5 |
| 3,517,327 | 6/1970 | Trenthart | 331/94.5 |
| 3,546,620 | 12/1970 | Erickson et al. | 331/94.5 |
| 3,611,231 | 10/1971 | Burke | 331/94.5 |

OTHER PUBLICATIONS

Court et al. "Frustrated Total Internal Reflection and Application of its Principle to Laser Cavity Design," Applied Optics, Vol. 3, pp. 719–726 June, 1964.

*Primary Examiner*—Ronald L. Wibert
*Assistant Examiner*—Edward S. Bauer
*Attorney*—Oblon, Fisher & Spivak

[57] ABSTRACT

A demand synchronized laser Q-switch of high optical efficiency and fast operation includes two prisms of fused quartz separated by a fraction of a wavelength of the laser light to be Q-switched and piezoelectric transducers mounted on the back sides of each prism. With no electrical signal applied to the piezoelectric transducers the prism separation produces frustrated total internal reflection that prevents laser oscillations between the two end mirrors of a laser cavity. Application of a voltage pulse to the piezoelectric transducers produces a shock wave in each prism that drives them into physical contact. The prisms then separate rapidly in response to reflection of the shock wave. When the prisms are sufficiently separated, laser oscillation between the cavity end mirrors occurs, and a high power output pulse is produced. The output pulse is terminated upon relaxation of the prisms or upon depletion of the population inversion, whichever occurs first. Alternatively, the prisms are separated sufficiently to allow total internal reflection, and application of a voltage pulse to the piezoelectric transducers brings the opposing faces of the prisms sufficiently close to produce high transmission of laser light through the two opposing faces.

8 Claims, 7 Drawing Figures 3,711,791

FRUSTRATED TOTAL INTERNAL REFLECTION LASER Q-SWITCH

BACKGROUND OF THE INVENTION

This invention relates generally to laser Q-switching and more particularly to laser Q-switching by mechanical shock wave excitation.

One type of prior art Q-switching device often used is the Pockels cell. Pockels cells, however, suffer from several undesirable characteristics. For example, their optical efficiency is only about 25 percent, and they require several thousand volts applied in pulse form to function properly. Pockels cells also generate unwanted optical radiation in the form of Rayleigh waves and Brillouin scattering. Although the Pockels cell has fast switch "on" time, it has slow switch "off" time, making it difficult to produce only one laser output pulse for each demand pulse. Furthermore, at neodymium laser wavelengths the Pockels cell has even lower optical efficiency due to absorbtion in its actuating medium, and the actuating medium is also hygroscopic.

Rotating mirrors have also been used for Q-switching lasers, but these devices suffer from the disadvantage of having moving parts. Consequently, rotating mirror Q-switches have low reliability and are subject to mechanical breakdown. Furthermore, rotating mirrors have a low maximum Q-switching rate of only 3,000 pulses per second due to the relatively slow moving mirrors.

A prior art laser Q-switch employing mechanical shock wave excitation is disclosed in U.S. Pat. No. 3,546,620 granted to Allen M. Erickson et al. on Dec. 8, 1970 on an invention entitled "Scanning Fabry-Perot Laser Q-Switch." This Q-switch consists of a shock excited Fabry-Perot interferometer positioned within a laser cavity that rapidly changes reflectivity upon being shock excited and thereby produces an output pulse. Although this Q-switch produces short duration output pulses at high laser efficiency, the power handling capacity of this device is limited by the power handling capacity of the Fabry-Perot dielectric mirrors.

SUMMARY OF THE INVENTION

Accordingly, one object of the present invention is to provide a new and improved laser Q-switch.

Another object of the present invention is the provision of a laser Q-switch capable of handling high power.

Still another object of the instant invention is to provide a laser Q-switch requiring low drive voltages and capable of operating over a large range of optical wavelengths.

A further object of the present invention is the provision of a fast operating laser Q-switch that opens and closes at the same rate.

A still further object of the present invention is to provide a laser Q-switch having high optical efficiency.

Another still further object of the present invention is to provide a new and improved method of laser Q-switching.

Briefly, in accordance with one embodiment of this invention, these and other objects are attained by providing a frustrated total internal reflection laser Q-switch comprising a pair of fused quartz prisms that are separated by a fraction of a wavelength of the laser light to be Q-switched, each having a piezoelectric transducer mounted on a back face. Application of a voltage pulse to the piezoelectric transducers produces a shock wave that drives the quartz prisms together. The resulting mechanical rebound by the prisms causes sufficient separation to allow high internal reflection within a laser cavity and generation of a laser output pulse.

In accordance with another embodiment of the instant invention, a laser cavity has between its end mirrors a frequency doubler and a frustrated total internal reflection Q-switch. The Q-switch is normally highly reflective to both the fundamental and second harmonic frequencies so that laser action is inhibited. Pulsing of the Q-switch causes the second harmonic to be switched out of the laser cavity while the fundamental remains in the laser cavity.

BRIEF DESCRIPTION OF THE DRAWINGS

A more complete understanding of the invention and many of the attendant advantages thereof will be readily appreciated as the same becomes better understood by reference to the following detailed description when considered in connection with the accompanying drawings wherein.

DESCRIPTION OF THE PREFERRED EMBODIMENT

Figure 1:
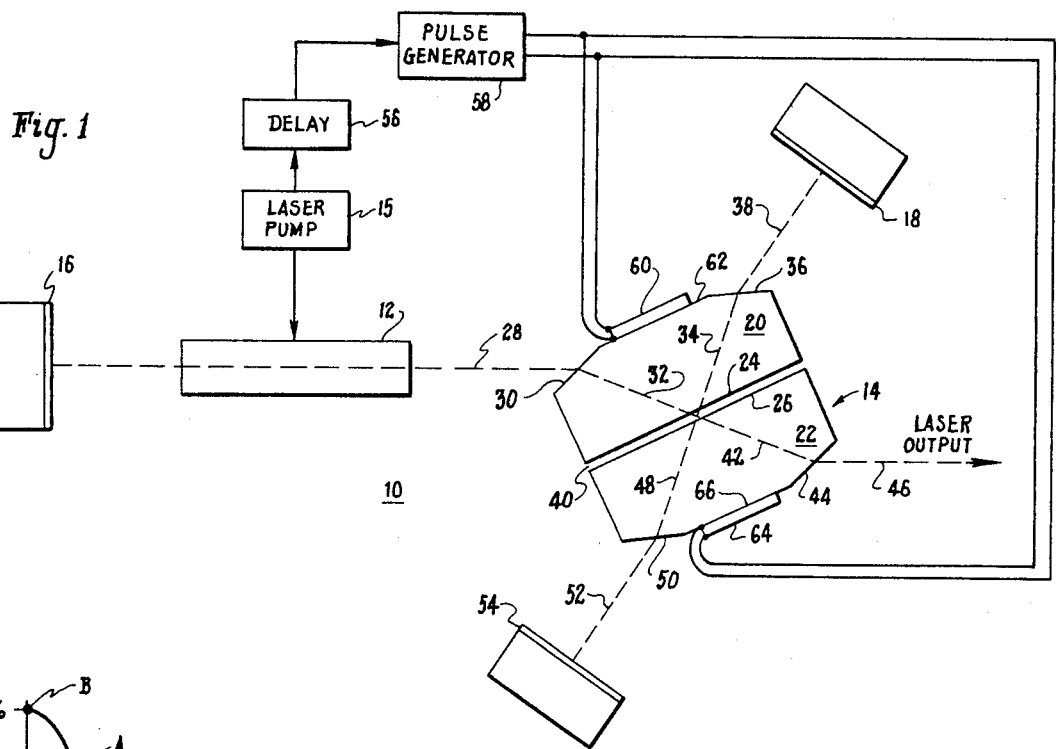
FIG. 1 is a schematic view of one embodiment of the laser Q-switch of the present invention.

Referring now to the drawings wherein like reference characters designate identical or corresponding parts throughout the several views and more particularly to FIG. 1 thereof, a laser Q-switching system 10 is illustrated as having a conventional pumpable laser rod 12, such as neodymium, and a frustrated total internal reflection (FTIR) Q-switch 14 in a laser cavity defined by 100 percent reflecting dielectric coated end mirrors 16 and 18. Laser rod 12 is energized by a conventional laser pump 15. FTIR Q-switch 14 consists of two fused quartz prisms 20 and 22, which have flat faces 24 and 26, respectively, that are positioned parallel to each other and separated by a fraction of the wavelength $\lambda_1$, of laser light produced by laser rod 12. For reasons described hereinafter, the normal spacing between face 24 of prism 20 and face 26 of prism 22 may be, for example, 0.08 $\lambda_1$. Initially, however, it will be assumed that prism 22 is not present.

If only prism 20 is present and if laser rod 12 is pumped above threshold by laser pump 15, laser light is produced that travels along an optical axis 28 into prism 20 through a face 30 which is at the Brewster angle relative to optical axis 28. In prism 20 the laser light is refracted along an axis 32 and strikes face 24 of prism 20. Axis 32 is at an angle relative to face 24 which is beyond the critical angle. Consequently, all of the laser energy is reflected back through prism 20 along an axis 34 to a face 36. The light emerges from prism 20 and is refracted again along an axis 38 which is at the Brewster angle relative to face 36. The light along axis 38 strikes end mirror 18 and is reflected back along axes 38, 34, 32 and 28 to end mirror 16. Thus, with prism 22 not present and with laser rod 12 pumped beyond threshold by pump 15, lasing will occur between end mirrors 16 and 18.

If quartz prism 22 is now positioned so that face 26 is within a fraction of wavelength $\lambda_1$, from face 24, frustrated total internal reflection occurs between prisms 20 and 22, and a predetermined percentage of the light incident at face 24 from path 32 is reflected along axis 34 while the remaining light is transmitted through an interface 40 and along an axis 42 in prism 22. It will be apparent that axis 42 is essentially a continuation of axis 32, with no refraction within interface 40. The laser light then emerges from a face 44 of prism 22 where it is refracted along a laser output axis 46 that forms the Brewster angle with face 44. Similarly, the same predetermined percentage of laser light returning from mirror 18 and travelling along axis 34 toward face 24 is reflected back along axis 32 while the remaining light passes through interface 40 into prism 22. In prism 22 this light travels along an axis 48 that is essentially continuous with axis 34. It then emerges from a face 50 of prism 22 and is refracted along an axis 52, which forms the Brewster angle with face 50, and strikes a conventional 100 percent reflective dielectric coated mirror 54. The light then reflects back along axis 52, through face 50, into prism 22 along axis 48. The same predetermined percentage of this light as above is reflected at face 26 along axis 42 and the remaining light is transmitted through interface 40 into prism 20 along axis 34. Reflections and transmissions continue in this manner with the light either returning along axis 28 to laser rod 12 or exiting from Q-switch 14 along axis 46.

Figure 2:
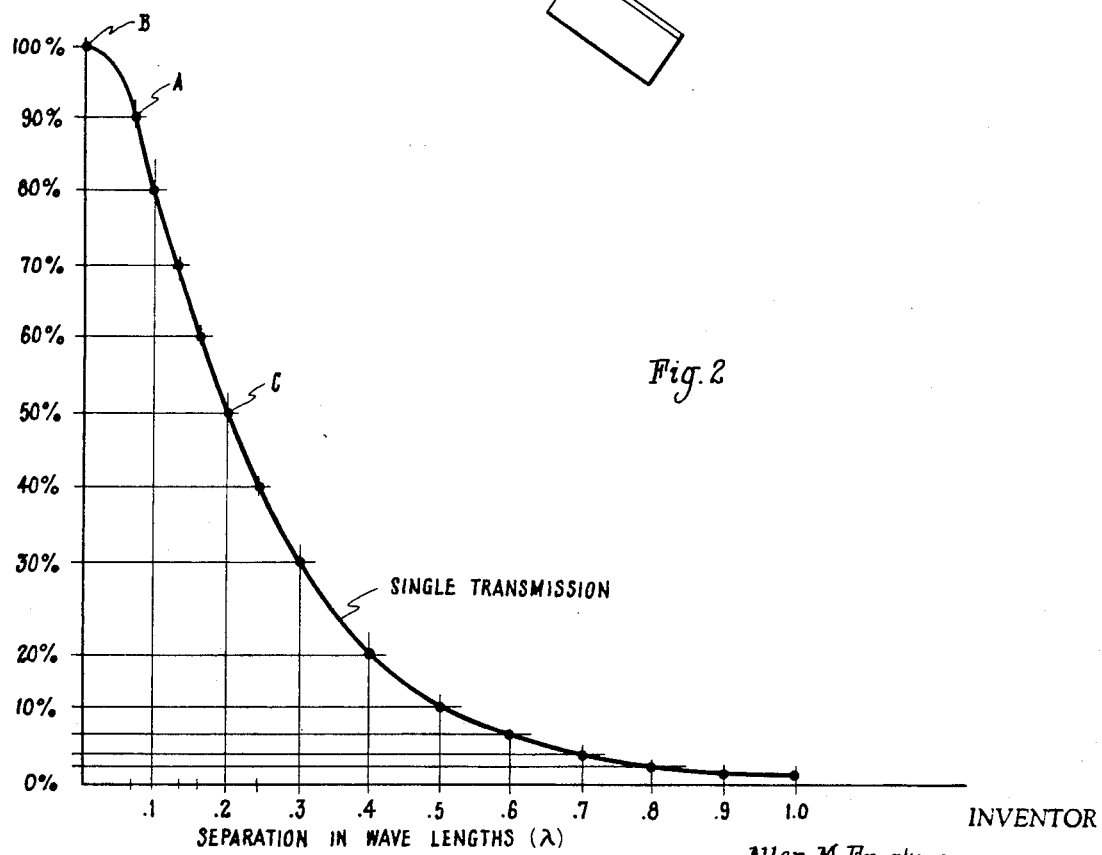
FIG. 2 is a plot of transmission vs. separation distance for a frustrated total internal reflection device.

The percentage of incident light transmitted through interface 40 for a given angle of incidence and index of refraction is a function of the separation distance between faces 24 and 26, as illustrated in the frustrated total internal reflection graph of FIG. 2. For example, with a 45° angle of incidence at interface 40 and an index of refraction of 1.5, this graph shows that a separation of 0.1 $\lambda_1$, will transmit 80 percent of the light and reflect only 20 percent, while for a separation of 0.4 $\lambda_1$, only 20 percent of the incident light is transmitted while 80 percent is reflected. If faces 24 and 26 are in physical contact so that there is no separation between them, all of the light is transmitted, i.e., prisms 20 and 22 appear to the incident light to be a single continuous prism having no interfaces.

Figure 3:
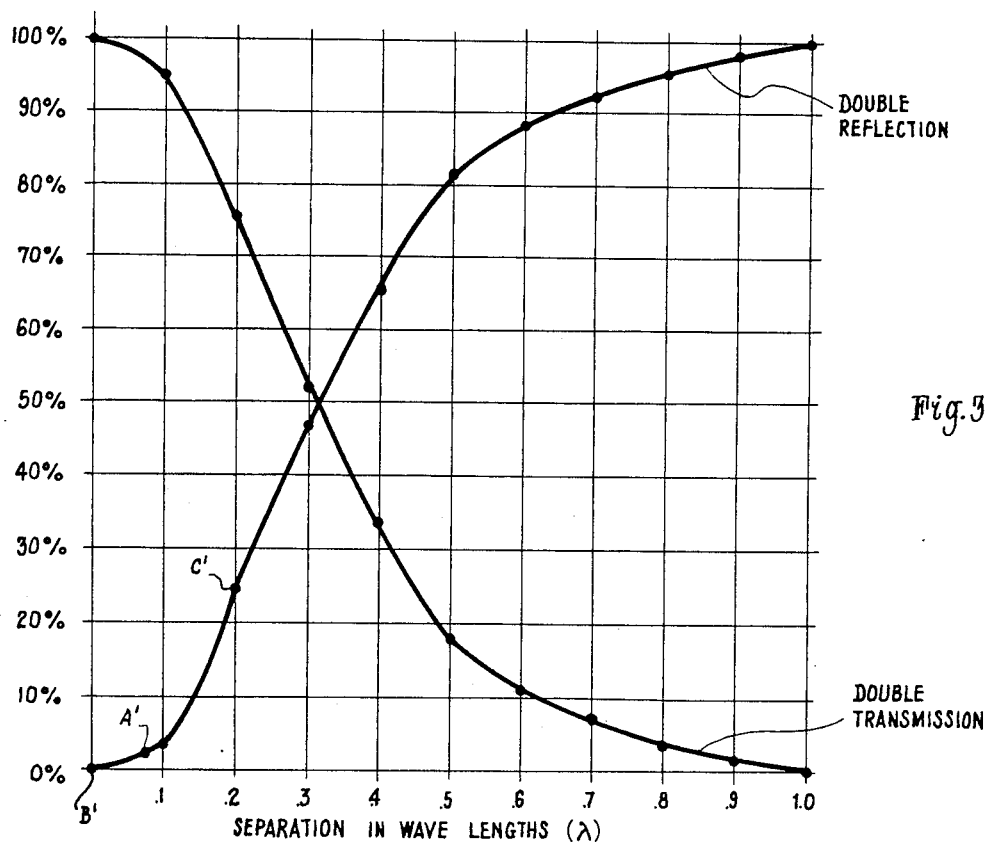
FIG. 3 is a plot of double reflection and double transmission versus separation distance for a frustrated total internal reflection device.

As described hereinbefore, the optical cavity for laser system 10 is between 100 percent reflective end mirrors 16 and 18. To achieve lasing within this cavity a minimum percentage, such, for example, as 25 percent, of the optical energy emitted by laser rod 12 must be returned to it. In the embodiment of the present invention illustrated in FIG. 1 prisms 20 and 22 are positioned close enough so that the amount of optical energy returning along axis 28 from Q-switch 14 is below this critical percentage required to sustain laser action. For a given amount of optical energy entering Q-switch 14 along axis 28, the double reflection curve of FIG. 3 illustrates the percentage of optical energy returning from Q-switch 14 to laser rod 12 along axis 28 versus separation between faces 24 and 26 assuming that mirror 54 is not present. This curve is merely the double reflection curve for the frustrated total internal reflection curve of FIG. 2, and is obtained by considering reflection at interface 40 rather than transmission and by considering the double pass of a laser beam through Q-switch 14. Thus, for example, if the interface separation is 0.1 $\lambda_1$, 20 percent of the light incident at interface 40 on the first pass through prism 20 is reflected to mirror 18, as shown in FIG. 2. On the return trip or second pass through prism 20, only 20 percent of the returning light, or 4 percent of the light originally emitted by laser rod 12 returns to rod 12. Since FIG. 3 considers the operation of Q-switch 14 in the absence of end mirror 54, 80 percent of the original light exits from Q-switch 14 along axis 46 and 16 percent of the original light exits from Q-switch 14 along axis 52. It should be apparent, however, that with mirror 54 present, a portion of the light exiting along axis 52 is returned to the laser cavity.

If at least 25 percent of the light entering Q-switch 14 from laser rod 12 must be returned to produce lasing, the double reflection curve of FIG. 3 indicates that the interface separation must be less than approximately 0.2 $\lambda_1$ to inhibit lasing, assuming mirror 54 is not present. With mirror 54 present the separation must be even less to ensure the inhibition of lasing. Thus, for example, the separation in one embodiment of the present invention has been set at 0.08 $\lambda_1$.

Figure 4A:
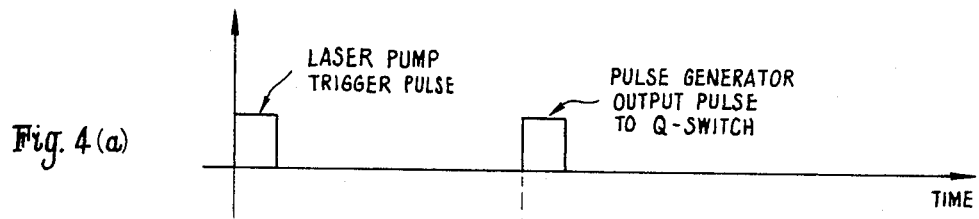
FIG. 4($a$) is a graph of a laser pump trigger pulse versus time, and FIG. 4($b$) is a graph of laser excitation versus time.
Figure 4B:
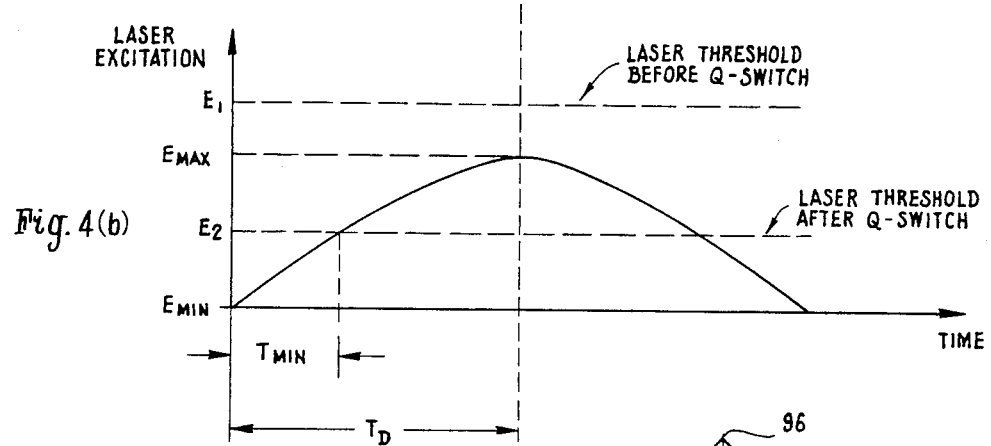

With laser operation inhibited by a small interface separation, a Q-switched laser pulse is produced as described hereinafter. To energize laser rod 12 for laser operation, laser pump 15 produces an optical pumping pulse in response to a laser pump trigger pulse illustrated in FIG. 4(a). Referring now to FIG. 4(b), the optical pumping pulse produces a typical laser excitation curve which begins at a minimum excitation $E_{MIN}$, increases to a maximum excitation $E_{MAX}$, and then decreases back to $E_{MIN}$ over a period of a few milliseconds. With a close interface separation, such as 0.08$\lambda_1$, the minimum laser excitation necessary to produce lasing is $E_1$, which is greater than $E_{MAX}$, and lasing is inhibited. As described hereinafter, however, the interface separation is increased sufficiently so that the minimum laser excitation necessary to produce lasing is reduced to $E_2$. With a minimum required excitation of $E_2$, however, a pump delay time $T_{MIN}$ elapses between the time the laser pump trigger pulse is generated and the time the laser has achieved the $E_2$ threshold level. Accordingly, the laser pump trigger pulse is applied to a conventional delay timer 56 which delays the trigger pulse by a time $T_D$ greater than $T_{MIN}$ during which the laser excitation is above threshold $E_2$ to ensure generation of a laser output pulse upon Q-switching. For example, $T_D$ may equal the time it takes the laser excitation to achieve $E_{MAX}$ after receiving a laser pump trigger pulse, as shown in FIGS. 4(a) and (b), to thereby produce an output laser pulse of maximum energy. The delayed pulse from delay 56 then triggers a conventional pulse generator 58 which generates a voltage output pulse. It should be apparent that a conventional pulse generator having a built-in trigger delay circuit and low output impedance can be used in place of delay timer 56 and pulse generator 58.

The output voltage pulse from pulse generator 58 is applied simultaneously to a piezoelectric ceramic transducer 60 cemented on a back face 62 of prism 20 and an identical piezoelectric ceramic transducer 64 cemented on a back face 66 of prism 22. Faces 62 and 66 are parallel so that transducers 60 and 64 are aligned parallel and define a shock excitation axis therebetween that passes at right angles through interface 40. the voltage pulse causes transducers 60 and 64 to expand rapidly toward each other creating mechanical shock waves in prisms 20 and 22 that move toward faces 24 and 26, respectively. When the shock waves reach faces 24 and 26 they cause the center portions of these faces to expand rapidly until they strike each other. If the original interface separation is $0.08\lambda_1$ corresponding to point A on the transmission curve of FIG. 2 and point A' on the double reflection curve of FIG. 3, the shock waves initially cause the transmission characteristic to move to point B at 100 percent transmission and the double reflection characteristic to move to point B' at 0 percent reflection. Thus, the laser continues to be prevented from lasing.

After faces 24 and 26 strike each other in response to the shock waves they rebound and move apart sufficiently to enable the simultaneous buildup of laser oscillations within the laser cavity between and mirrors 16 and 18 and the dumping of the laser pulse created by these oscillations along output axis 46. If the minimum double reflection required to produce lasing is 25 percent of the light incident on Q-switch 14, as described hereinbefore, the interface separation becomes greater than $0.2\lambda_1$ on rebound, which corresponds to 25 percent double reflection and 50 percent transmission through interface 40. This point is shown as point C on the transmission curve of FIG. 2 and point C' on the double reflection curve of FIG. 3. Finally, faces 24 and 26 return to their original rest position and lasing is again prevented when the interface separation becomes less than $0.2\lambda_1$.

All of the available laser energy is dumped in a single pulse when faces 24 and 26 become sufficiently separated during rebound to enable oscillation, since the rebound period is substantially longer than the time required to dump all of the available laser energy. For example, faces 24 and 26 may be sufficiently separated for 100 nanoseconds, while only 20 nanoseconds are required to dump the available laser energy.

Normally, laser pump 15 delivers pumping energy to laser rod 12 for a much longer period of time than the dumping time of the Q-switched cavity. For example, optical pumping by laser pump 15 continues for a few milliseconds, while the available energy may be dumped in 20 nanoseconds, as described hereinbefore. Consequently, during a single pump cycle, laser rod 12 is repumped above threshold after being Q-switched and can be Q-switched again by applying another pulse to transducers 60 and 64. In an alternative embodiment of the present invention, the delayed trigger pulse from delay timer 56 triggers a conventional pulse generaltor to produce a series of spaced voltage pulses during a single pump cycle, each of which produces a single Q-switched laser output pulse, as described hereinbefore. For example, in one embodiment of the present invention the pulse generator produces a series of pulses during the laser pump cycle at a 200 K Hz rate which generates eighty Q-switched laser output pulses spaced 5 microseconds apart.

Two simultaneous laser output pulses of equal amplitude are obtained from an alternative embodiment of the present invention by removing end mirror 54 and by increasing the original interface separation to approximately $0.15\lambda_1$. During the rebound period when oscillations occur in the cavity, the same amount of energy emerges along axis 46 as along axis 52. Three simultaneous laser output pulses of equal amplitude are obtained merely by replacing 100 percent reflective end mirrors 16 and 18 of FIG. 1 with 70 percent reflective end mirrors.

Figure 5:
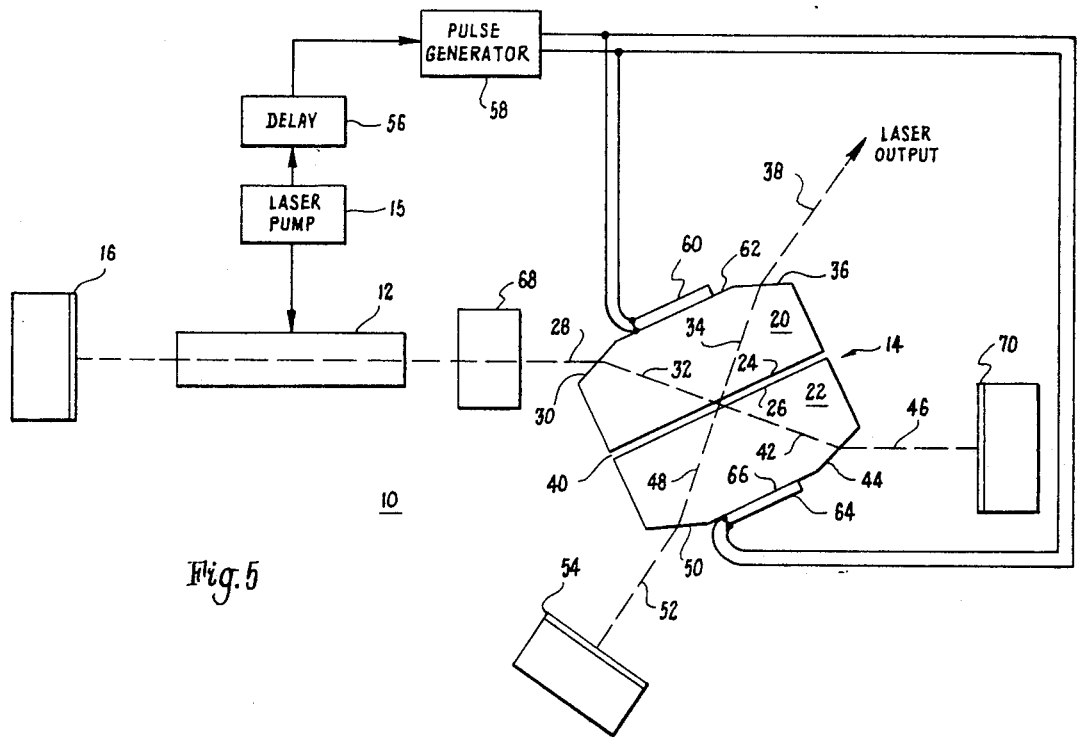
FIG. 5 is a schematic view of a frequency doubling frustrated total internal reflection Q-switch according to the present invention.

Q-switch 14 can also be used to produce a frequency-doubled laser output, as shown in FIG. 5. This embodiment is the same as the embodiment of FIG. 1, except that a frequency doubling element 68, such as a KDP crystal, is inserted in the laser cavity in line with optical axis 28, a 100 percent reflective end mirror 70 is positioned to reflect the light emerging from prism 22 along axis 46 back along axis 46 into prism 22, and end mirror 18 is no longer present. Consequently, the laser cavity is defined by end mirrors 16 and 70, and the optical path within the laser cavity is along axes 28, 32, 42, and 46. Furthermore, faces 24 and 26 are positioned more than 1 wavelength $\lambda_1$ of the fundamental frequency produced by rod 12 apart to produce total internal reflection within prisms 20 and 22. Since no light is transmitted through interface 40 when prisms 20 and 22 are in their rest positions, laser operation is inhibited.

A laser output consisting primarily of light having twice the frequency of the light generated by laser rod 12 is produced along axis 38 as described hereinafter. A pulse from pulse generator 58 is applied simultaneously to ceramic transducers 60 and 64 a time $T_D$ after laser pump 15 has been triggered, as described hereinbefore. The resulting mechanical shock waves propagating through prisms 20 and 22 drive faces 24 and 26 towards each other. Since these faces are originally positioned more than $\lambda_1$ apart, however, they do not strike each other upon being expanded, but come close enough to enable laser oscillation to buildup in the cavity. For example, if at least 25 percent of the light incident upon Q-switch 14 must be returned to laser rod 12 to enable oscillation, the double transmission curve of FIG. 3, which assumes end mirror 54 is not present, shows that the interface separation must be less than approximately $0.45\lambda_1$.

Figure 6:
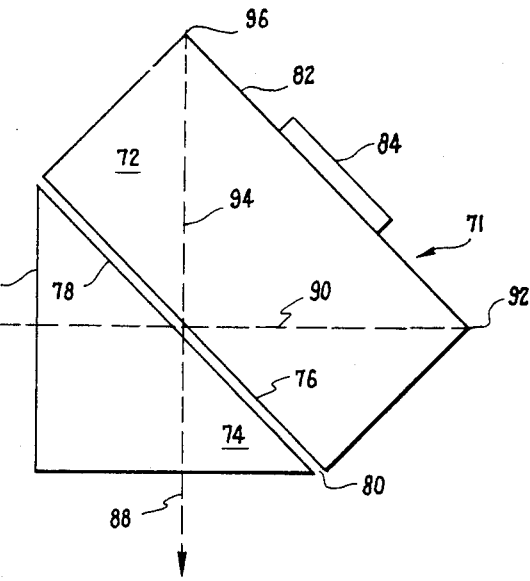
FIG. 6 is a schematic view of an alternative prism arrangement for the Q-switch of the present invention.
Figure 7:
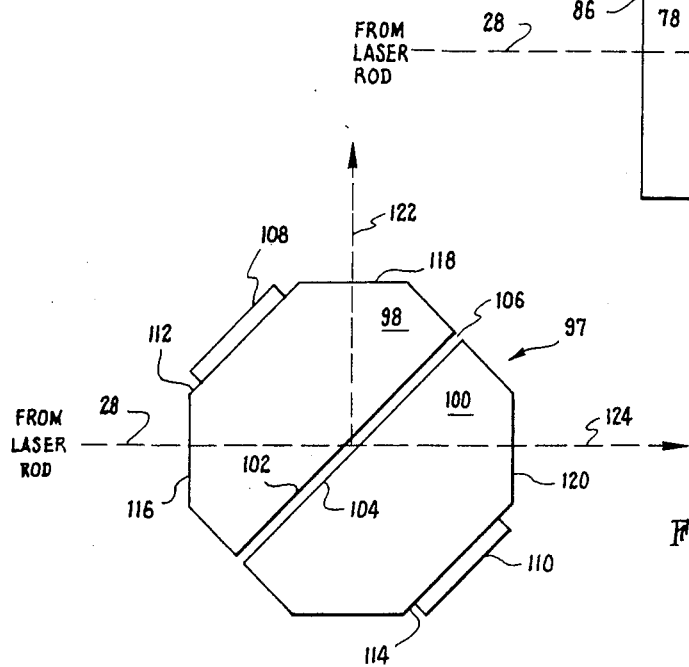
FIG. 7 is a schematic view of another alternative prism arrangement for the Q-switch of the present invention.

With the interface separation small enough to permit oscillations within the cavity, light emerges from laser rod 12 and passes through frequency doubling element 68 where a fraction of the light is doubled in frequency. For example, a KDP crystal has a single pass frequency doubling efficiency of approximately 6 percent, so that 6 percent of the light emerging therefrom has a wavelength of $\lambda_2=\lambda$. Both the fundamental and second harmonic light beams enter Q-switch 14 and strike face 24 of prism 20. Assuming that after being shock excited by transducers 60 and 64 faces 24 and 26 come with 0.08$\lambda_1$ of each other, 90 percent of the fundamental is transmitted through the interface and 10 percent is reflected out of the laser cavity along axes 34 and 38. Since the second harmonic has a wavelength of $\lambda_2={}^1\!/_2\lambda$, however, the interface separation is equal to 0.16$\lambda_2$, and only 60 percent of the second harmonic is transmitted while 40 percent is reflected out of the laser cavity. Upon return of the light from mirror 70, 90 percent of the fundamental passes through interface 40 to the remainder of the laser cavity and 10 percent is reflected to mirror 54, while only 60 percent of the second harmonic returning from mirror 70 is returned to the laser cavity, and 40 percent is reflected to mirror 54. Oscillation continues in this manner during the time that faces 24 and 22 are close enough to enable oscillation, with most of the fundamental remaining in the laser cavity and a high percentage of the second harmonic being dumped out of the cavity. Thus, it will be apparent that Q-switch 14 not only acts as a beam splitter but actually increases the effective efficiency of frequency doubling element 68. Furthermore, the Q-switching function and beam splitting function are carried out with a single device, rather than with a separate Q-switch and wavelength discriminating mirrors as in the prior art. Since wavelength discriminating mirrors are expensive and are incapable of handling large amounts of power, the embodiment of FIG. 5 overcomes a serious limitation in prior art Q-switched beam splitters. Furthermore, with additional optical elements the laser Q-switch of the present invention can be utilized to generate 4th harmonic output pulses. Obviously, numerous modifications of the Q-switch of the present invention are possible in the light of the above teachings. For example, FIGS. 6 and 7 illustrate two alternative embodiments of the Q-switch. In FIG. 6, a Q-switch 71 consists of a prism 72 having a rectangular cross section and a prism 74 having a triangular cross section. A face 76 of prism 72 and a face 78 of prism 74 are parallel and separated by a fraction of a wavelength of laser light to produce an interface region 80. Prism 74 is rigidly mounted and a face 82 which is parallel with face 76 has a ceramic transducer 84 mounted thereon. Light from laser rod 12 enters prism 74 through a face 86 and, depending upon the interface separation as described hereinabove, is either reflected at interface 80 along an axis 88 out of Q-switch 71, or is transmitted through interface 80 along an axis 90 to a corner reflector 92. Corner reflector 92 reflects all of the light incident thereon back to interface 80 along axis 90. At interface 90, this light is either transmitted along axis 18, or reflected along an axis 94 to another corner reflector 96. Corner reflector 96 then returns all of the light incident thereon to interface 80 along axis 94, where the light is either transmitted along axis 88 or reflected along axis 90.

In FIG. 7, a Q-switch 97 consists of two identical six-sided prisms 98 and 100 having closely spaced parallel faces 102 and 104, respectively, defining an interface 106. Ceramic transducers 108 and 110 are mounted on parallel back faces 112 and 114 of prisms 98 and 100, respectively. Q-switch 97 operates in a similar manner to Q-switch 14, except that there is no refraction of light entering or leaving Q-switch 97, since faces 116, 118, and 120 through which light passes are perpendicular to their respective optical axes 28, 122, and 124.

By positioning mirrors external to Q-switches 71 and 97, they can be made to operate in a variety of ways, as with Q-switch 14. Furthermore, any of these Q-switches can be used in numerous other laser devices. For example, they can be employed in a ruby ring laser to enable a pulse output from oscillations occurring in only one direction within the ring cavity. In addition, the laser Q-switches of the present invention can be used with any rod type lasers, such as ruby, neodymium, YAG, YIG, or with Q-switchable gas lasers, such as carbon dioxide lasers. It is therefore to be understood that within the scope of the appended claims, the invention may be practiced otherwise than as specifically described herein.

What is claimed as new and desired to be secured by Letters Patent of the United States is:

1. A frustrated total internal reflection laser Q-switch for Q-switching laser light of a specified wavelength out of a laser cavity comprising:
   a first optically transparent prism positionable in said laser cavity and having a first face against which all of said laser light entering said first prism strikes;
   a second optically transparent prism having a second face positioned parallel to said first face and separated from said first face by a first predetermined fraction of said specified wavelength, whereby laser action is inhibited in said laser cavity by frustrated total internal reflection at said first face; and
   switching means for, projecting shock waves through said first and second prisms, said shock waves oriented parallel to said first and second faces to cause said first and second faces to expand toward one another.

2. The laser Q-switch of claim 1, wherein said switching means comprises:
   a first piezoelectric transducer mounted on said first prism and connectable to a source of voltage pulses;
   a second piezoelectric transducer mounted on said second prism and aligned with said first piezoelectric transducer to define a shock excitation axis passing through said first and second prisms and said first and second faces, and connectable to a source of voltage pulses, whereby a voltage pulse applied to said first and said second piezoelectric transducers produces shock waves in said first and said second prisms that propagate toward each other along said shock excitation axis and cause said first and said second faces to expand rapidly toward one another and switch a laser pulse out of said laser cavity.

3. The laser Q-switch of claim 2, wherein said first optically transparent prisms includes at least two faces at the Brewster angle relative to said laser light entering said first prism and a face parallel to said first face on which said first piezoelectric transducer is mounted, and said second optically transparent prism includes at least two faces at the Brewster angle relative to said laser light entering said second prism and a face parallel to said second face on which said second piezoelectric transducer is mounted.

4. A method of Q-switching laser light out of a laser cavity comprising the steps of:
   closely positioning opposing faces of a pair of optically transparent prisms in said laser cavity to produce frustrated total internal reflection in said laser cavity and inhibit lasing; and
   propagating shock waves through said pair of prisms parallel to said opposing faces to alter the spacing between said faces by expansion thereof due to said shock waves thereby changing the reflection in said laser cavity, whereby lasing occurs and a laser output pulse is generated.

5. A frustrated total internal reflection laser Q-switch for Q-switching laser light of a specified wavelength out of a laser cavity comprising:
   a pair of optically transparent prisms having respective opposing faces normally separated by a first predetermined distance to prevent lasing in said laser cavity; and
   switching means for causing said opposing faces to be briefly separated by a second predetermined distance to effect lasing in said laser cavity and switching of a laser pulse out of said laser cavity, said switching means including a transducer mounted on a surface of one of said prisms oriented parallel to said opposing surfaces for projecting shock waves through said one prism to cause at least one of said opposing surfaces to expand toward the other.

6. A frustrated total internal reflection laser Q-switch for Q-switching laser light of a specified wavelength out of a laser cavity as in Claim 5, wherein said switching means comprises a pair of piezoelectric transducers mounted respectively on said pair of prisms and aligned to define a shock excitation axis passing through said opposing faces of said pair of prisms, and wherein said pair of piezoelectric transducers are connectable to a source of voltage pulses, whereby a voltage pulse applied to said pair of piezoelectric transducers produces mechanical shock waves in each of said pair of prisms that propagate along said shock excitation axis to said opposing faces producing rapid movement of said opposing faces from said first predetermined separation distance to said second predetermined separation distance.

7. The laser Q-switch of claim 5, wherein said first predetermined distance is a specified fraction of said specified wavelength of said laser light to make said opposing faces highly transmissive to said laser light, and said second predetermined distance is sufficiently greater than said first predetermined distance to make said opposing faces highly reflective of said laser light.

8. The laser Q-switch of claim 5, wherein said first predetermined distance is a specified fraction of said specified wavelength of said laser light to make said opposing faces highly reflective of said laser light, and said second predetermined distance is sufficiently less than said first predetermined distance to make said opposing faces highly transmissive of said laser light.

* * * * *